United States Patent [19]

Robertson et al.

[11] Patent Number: 4,635,953
[45] Date of Patent: Jan. 13, 1987

[54] TOW CABLE WITH BRACKET AND STORAGE MEANS

[76] Inventors: Jesse C. Robertson; Beverly M. Robertson, both of 395 N. 54th St., Springfield, Oreg. 97478

[21] Appl. No.: 770,524

[22] Filed: Aug. 29, 1985

[51] Int. Cl.⁴ .............................................. B60D 1/18
[52] U.S. Cl. .................................................... 280/480
[58] Field of Search ........................... 280/480; 254/199

[56] References Cited

U.S. PATENT DOCUMENTS 3,881,751  5/1975  Colby ................................... 280/480

Primary Examiner—John J. Love
Assistant Examiner—Donn McGiehan
Attorney, Agent, or Firm—John F. Ingman

[57] ABSTRACT

A tow cable with bracket and storage means, which includes a tow cable which is attached to a vehicle by means of a heavy steel bracket to which is welded a cable housing in the form of a flexible tubing of at least the length of the tow cable. The flexible tubing is attached to the undercarriage configuration of the vehicle so as to provide permanent, on-vehicle, protected storage for the cable. An end plate is welded at the end of the bracket with a hole formed therein so as to align with the end of the flexible tubing. A stop sleeve is pressed on the non-extending end of the cable; the hole in the end plate being sized to permit passage of the cable, but not the stop sleeve. A smooth steel slip hook, is attached to the extendable end of the cable. A hook receiving means, such as a circular ring, is welded to the bracket to provide a location for the slip hook when the cable is not in use and is stored in the cable housing.

1 Claim, 2 Drawing Figures

TOW CABLE WITH BRACKET AND STORAGE MEANS

BACKGROUND OF THE INVENTION

1. Field of the Invention

The present invention generally relates to towing devices and, more particularly, is concerned with a towing cable which is attached to the vehicle with permanent or semi-permanent mounting and with housing for storage.

2. Description of the Prior Art

Emergency towing of one vehicle by another is most commonly accomplished by the use of fibre ropes, wire ropes or chains. There are numerous disadvantages to their use in the current form, to include the inability to quickly locate them, having to look under or behind seats, or in a rear compartment underneath an accumulation of tires, toolboxes, luggage, tire jacks, etc.; looking for the towing device in the dark with no flashlight available; and leaving the towing device at home after cleaning the vehicle or after the last prior use. The tying and untying of knots in a rope, wire or chain also poses problems. A further disadvantage includes sometimes having to kneel or lie in mud or snow to hook up or unhook the towing device on the towing vehicle, thereby causing considerable discomfort and soiled clothing. In addition, being left out in the elements, such as in a pickup bed, causes "wear and tear" on the commonly used towing devices.

SUMMARY OF THE INVENTION

The present invention provides a towing device which is designed to overcome the aforementiond disadvantages of the conventional emergency towing devices. The invention embodies a towing cable which is attached to a vehicle within permanent housing, readily available for easy extension and use, and subsequent retraction and storage.

Accordingly, the present invention, in its preferred embodiment provides a tow cable which is attached to a vehicle by means of a heavy steel bracket to which is welded a cable housing in the form of a flexible tubing of at least the length of the tow cable. The flexible tubing is attached to the undercarriage configuration of the vehicle so as to provide permanent, on-vehicle, protected storage for the cable. An end plate is welded at the end of the bracket with a hole formed therein so as to align with the end of the flexible tubing. A stop sleeve is pressed on the non-extending end of the cable; the hole in the end plate being sized to permit passage of the cable, but not the stop sleeve. A smooth steel slip hook, is attached to the extendable end of the cable. A hook receiving means, such as a circular ring, is welded to the bracket to provide a location for the slip hook when the cable is not in use and is stored in the cable housing.

Thus configured, the two cable with bracket and storage means is economical to manufacture, simple to install and to use. When needed, the hook is removed from the ring and the cable pulled out to be connected to the disabled vehicle. When a towing operation is concluded, the tow cable is unhooked from the towed vehicle, pushed directly back through the attaching bracket into the protective flexible cable housing, and the hook re-attached to its ring.

DESCRIPTION OF THE PREFERRED EMBODIMENT

Figure 1:
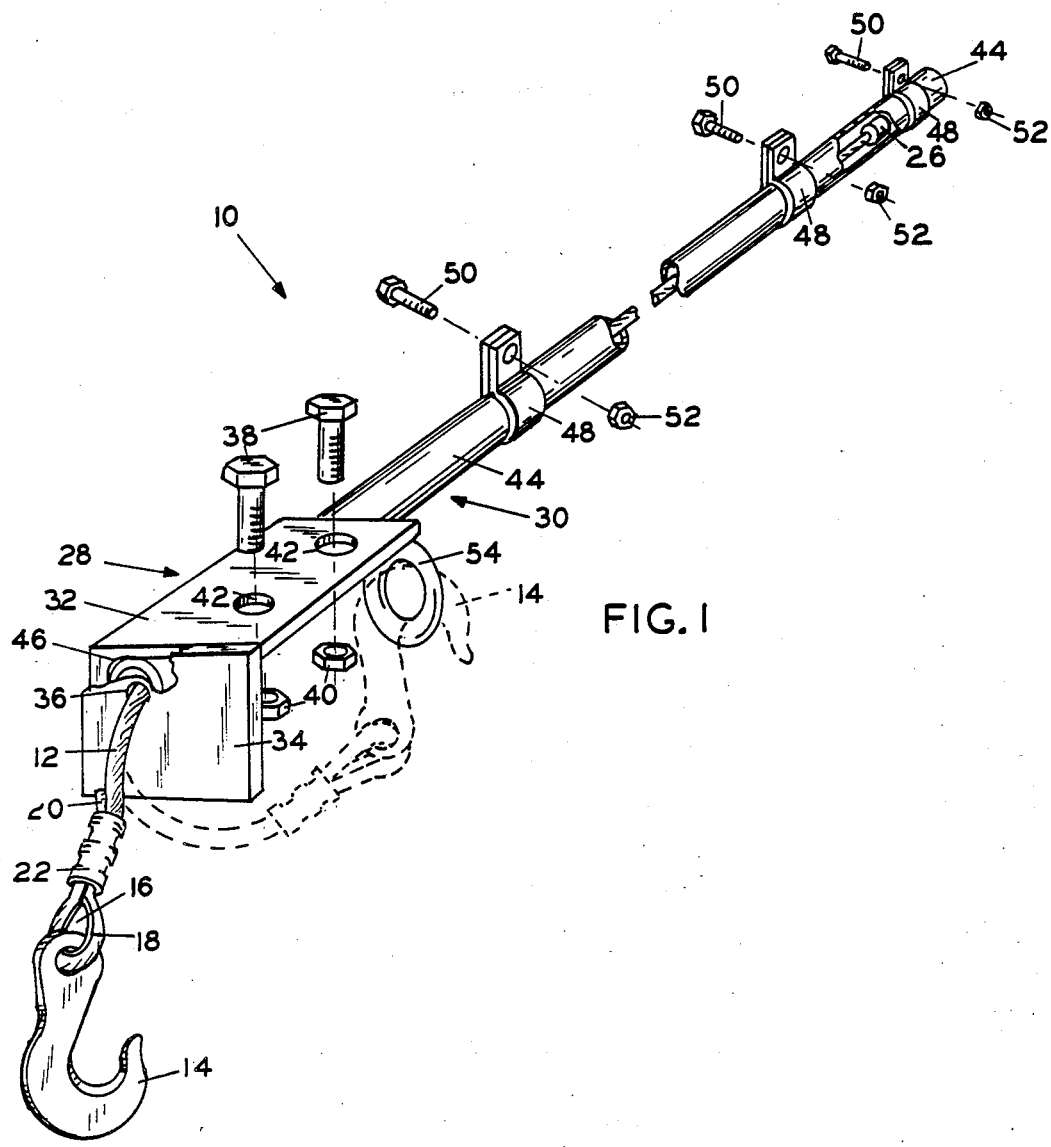
FIG. 1 provides a side perspective view of the tow cable with bracket and storage member, according to the invention.
Figure 2:
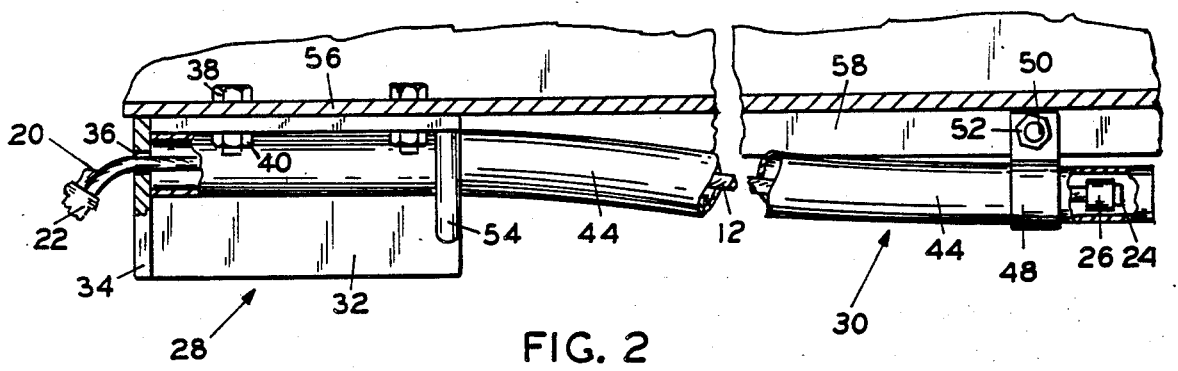
FIG. 2 provides a side view of the tow cable with bracket and storage member of FIG. 1, also illustrating possible vehicle attachment.

Referring now to the drawings, there is shown the preferred embodiment of the tow cable with bracket and storage means 10. The preferred embodiment described is for a light duty unit, as would be mounted on a light pickup truck or similar vehicle. Heavier duty assemblies would consist of stronger components, as would be appreciated by those persons familiar with the art.

The two cable 12 itself is preferably a 5/16 inch galvanized aircraft cable, having at one end thereof a connector means, preferably a slip hook 14 which is attached to the cable 12 by means of an eye 16 which has been formed by the cable 12 being looped about a thimble 18 with the end 20 being secured to the cable 12 by being pressed thereagainst by means of a oval sleeve 22. The other end 24 of the cable 12 is characterized by a steel stop sleeve 26 which has been pressed on at end 24 in a conventional manner.

The bracket 28 is provided to permanently attach, as by welding, or semi-permanently attach, as by bolting, the tow cable 12 and cable housing 30 to the undercarriage, preferably a frame member 56, of the vehicle. In the preferred embodiment illustrated, the bracket 28 is constructed of a four-inch long section of 2×3×¼-inch angle iron 32, to which, at one end, as shown in the drawings, is abutted, and attached by welding, an end plate 34 made of a 2×3×⅜-inch flat bar. Near that corner of the flat plate 34 near the curve 46 of the angle iron 32, is formed a hole 36 which is sized to permit the cable 12 to easily pass through but which will not allow the passage of the stop sleeve 26 which is affixed to the end 24 of cable 12, as previously noted. Thus the user has use of essentially the full length of the cable 12. As illustrated for semi-permanent attachment to a vehicle, the bracket 28 preferably is attached to a frame member 56 by ¼×2-inch machine bolts 38 and nuts 40 through appropriately located holes 42 formed in the angle iron 32.

The cable housing 30, used for storage of the cable 12 when not in use, is made of a section of flexible tubing 44, of at least the length of the cable 12, which is attached, as by welding, to the inside curve 46 of the angle iron 32, so as to be aligned with the hole 36. The portion of the flexible tubing 44 extending beyond the bracket 28 is supported by any suitable portion of the vehicle undercarriage 58 by appropriate means, it being found that "0" clamps 48 fastened with machine bolts 50 and nuts are preferable in at least some applications. It should be noted that the use of flexible tubing 44 to store the cable 12 allows great latitude in the installation of the tow cable with bracket and storage means 10, and particularly the location of the cable housing 30, which may be placed so as to best conform with the configuration of the vehicle to protect the tow cable 12 from the under-vehicle environment and hazards.

A circular ring 54 is welded to the angle iron 32 as shown in the figures to provide a location for placement of the slip hook 14 when the cable 12 is not in use and is stored in the cable housing 30. This placement of the slip hook 14 within the circular ring 54 is illustrated in FIG. 1 in phantom.

The two cable with bracket and storage member 10 may be attached either to the front or rear of a vehicle.

It is thought that the tow cable with bracket and storage member of the present invention and its many attendant advantages will be understood from the foregoing description and that it will be apparent that various changes may be made in form, construction and arrangement of the parts thereof without departing from the spirit and scope of the invention or sacrificing all of its material advantages, the form hereinbefore described being merely an exemplary embodiment thereof.

We claim:

1. A towing device, whereby a towing vehicle may pull a disabled vehicle, which comprises:
   (a) a cable, having a first end, a second end, and a diameter, wherein attached to the said first end is a connector means for attachment to a disabled vehicle, and at the said second end there are means attached to significantly increase the said diameter of the said cable;
   (b) a cable housing, having a first end and a second end, and being constructed of flexible tubing, of such diameter and length as to contain the said cable and the said second end means for increasing the said diameter of said cable;
   (c) a bracket member for attachment to the undercarriage of the towing vehicle, said bracket member having an end plate oriented generally transverse to the longitudinal axis of the vehicle, said end plate of said bracket member having a hole formed therein of such size as to permit free passage of said cable but to deny through passage of the said cable with the said second end means for increasing the diameter of the said cable attached thereto;
   (d) said cable housing being securely attached at its said first end to the said bracket so as to be aligned with said hole of said end plate of said bracket, wherein, when assembled, the said first end of said cable, with said connector means attached, extends through the said hole, and the said second end of said cable, with said second end means for increasing the said diameter of said cable attached, remains within the said cable housing;
   (e) means for attaching the said cable housing at a plurality of locations between the said first end and the said second end of said cable housing to the said undercarriage of said towing vehicle; and
   (f) connector receiving means, attached to said bracket, so as to provide for securing said connector means when the said cable is not in use and is stowed in said cable housing.

* * * * *